US008127600B2

(12) United States Patent
Olson

(10) Patent No.: US 8,127,600 B2
(45) Date of Patent: Mar. 6, 2012

(54) MONITOR FOR MANUAL TRAILER BRAKE ACTIVATION

(75) Inventor: Ken Olson, Saskatchewan Province (CA)

(73) Assignees: Clay Meier, Saskatoon, Saskatchewan (CA); Ken Olson, Saskatoon, Saskatchewan (CA)

( * ) Notice: Subject to any disclaimer, the term of this patent is extended or adjusted under 35 U.S.C. 154(b) by 839 days.

(21) Appl. No.: 12/097,481

(22) PCT Filed: Dec. 14, 2006

(86) PCT No.: PCT/CA2006/002057
§ 371 (c)(1),
(2), (4) Date: Sep. 18, 2008

(87) PCT Pub. No.: WO2007/068124
PCT Pub. Date: Jun. 21, 2007

(65) Prior Publication Data
US 2009/0206652 A1    Aug. 20, 2009

(30) Foreign Application Priority Data
Dec. 14, 2005   (CA) ...................................... 2530102

(51) Int. Cl.
*G01L 5/28*   (2006.01)
(52) U.S. Cl. ........................................... 73/121; 73/129

(58) Field of Classification Search .................... 73/121, 73/129; 303/138, 166
See application file for complete search history.

(56) References Cited

U.S. PATENT DOCUMENTS

| 4,712,422 | A |   | 12/1987 | Munroe |
| 4,793,661 | A | * | 12/1988 | Munro ............................ 303/89 |
| 5,905,433 | A | * | 5/1999 | Wortham ....................... 340/431 |
| 5,999,091 | A | * | 12/1999 | Wortham ....................... 340/431 |
| 6,847,869 | B2 | * | 1/2005 | Dewberry et al. ............... 701/29 |
| 7,086,503 | B2 | * | 8/2006 | Miller et al. ............. 188/1.11 L |
| 7,216,552 | B2 | * | 5/2007 | Fogelstrom .............. 73/862.326 |
| 7,363,127 | B2 | * | 4/2008 | Fogelstrom ..................... 701/29 |
| 7,415,325 | B2 | * | 8/2008 | Knosmann et al. ............... 701/1 |
| 2004/0011596 | A1 | * | 1/2004 | Miller et al. ............ 188/1.11 W |

FOREIGN PATENT DOCUMENTS

| CA | 2454996 A1 | 7/2004 |
| FR | 2659159 A1 | 6/1991 |

* cited by examiner

*Primary Examiner* — Freddie Kirkland, III
(74) *Attorney, Agent, or Firm* — Barbara A. Wrigley; Oppenheimer Wolff & Donnelly, LLP

(57) ABSTRACT

In a highway tractor trailer vehicle, a brake control sensor is operative to detect each activation of the manual trailer brake control, and a recorder receives and stores data comprising a speed of the tractor at each manual trailer brake control activation. Trailer brake wear is reduced by penalizing an operator of the tractor for each unauthorized activation of the manual trailer brake control. Testing of the connection of the tractor to the trailer is encouraged by tracking the activation of the manual trailer brake control and penalizing the operator for failure to test the connection.

6 Claims, 1 Drawing Sheet

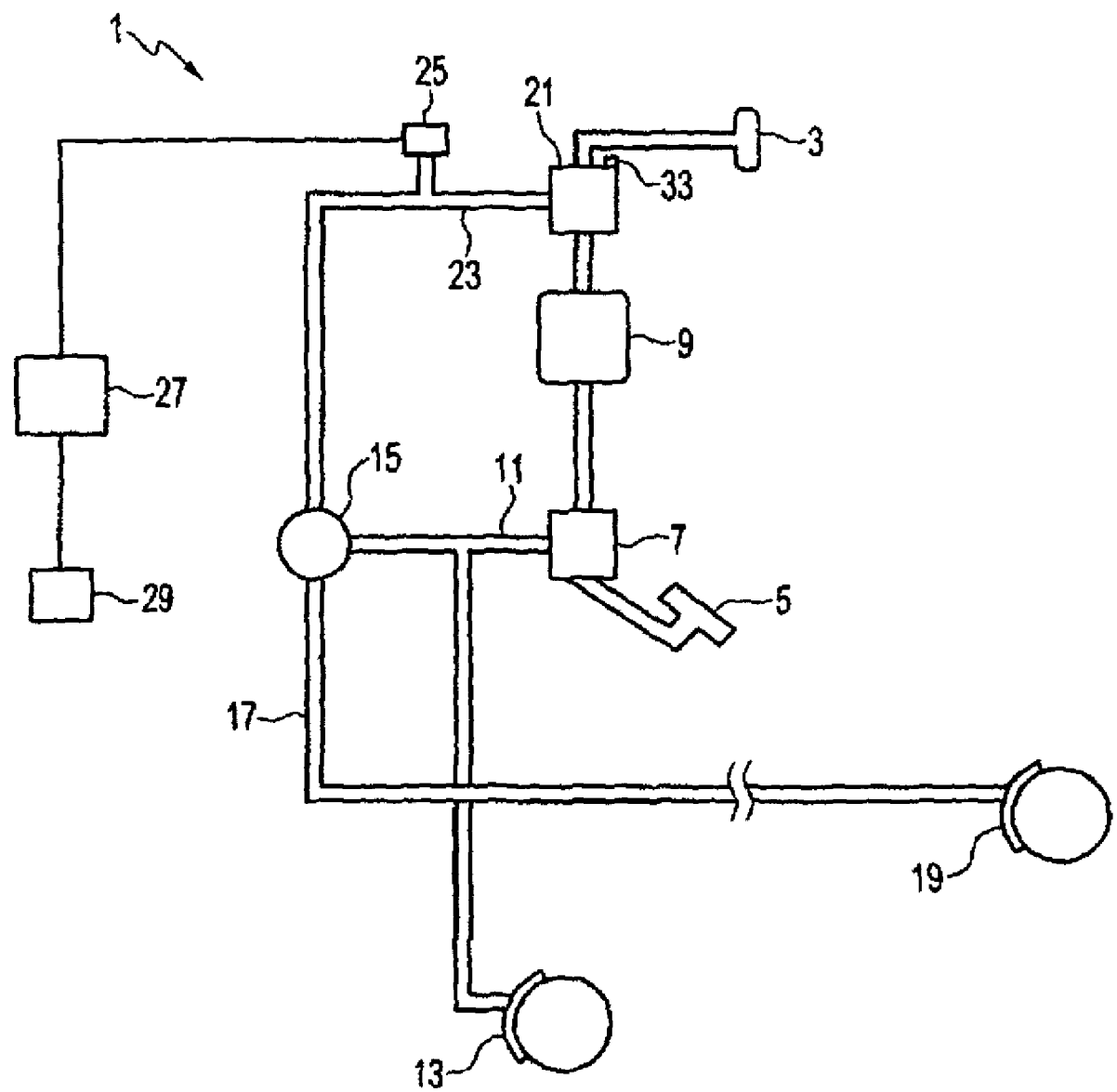

MONITOR FOR MANUAL TRAILER BRAKE ACTIVATION

CROSS REFERENCE TO RELATED APPLICATIONS

This application is the National Stage of International Application No. PCT/CA2006/002057, filed Dec. 14, 2006, which is hereby incorporated by reference in its entirety.

FIELD OF THE INVENTION

This invention relates to highway tractor trailer vehicles and in particular braking systems for such vehicles

BACKGROUND OF THE INVENTION

Highway tractor trailer vehicles include separate systems of brakes on each of the tractor and the trailer. The systems are connected when the tractor is hitched to the trailer by, connecting a set of air lines from the tractor to the trailer. The systems are coordinated such that when the brake pedal on the tractor is depressed, the brakes on both the tractor and the trailer are activated.

A separate manual hand operated trailer brake control or "spike" control is also provided in the track so that the operator can activate the trailer brakes without activating the truck brakes. The manual trailer brake control is used at low speeds to check that the trailer brakes are operating by allowing the truck to roll while applying only the trailer brakes.

The operator will know the trailer brakes are operating because the trailer brakes will stop the vehicle without any tractor brakes being applied. This procedure, sometimes called a "tug test" is a safety measure in that testing the trailer brakes immediately after connection of the tractor to the trailer also ensures that die trailer is properly connected to the tractor. If the connection is not secure, instead of the trailer dragging the tractor to a stop when the trailer brakes are applied, the connection will separate. Such separation at low speeds in the trucking yard poses a much safety risk compared to such separation later in the trip. Separation of the trailer from the tractor presents a significant safety risk, and stopping the truck by applying the trailer brakes, ensures that the connection is secure.

The manual trailer brake control is also necessary to allow the trailer brakes to be applied independently to control a jack-knife situation. Activating the trailer brakes alone slows the trailer down and pulls the vehicle straight to correct the jack-knife situation.

Brake failure or malfunction is a significant factor in highway accidents. Brake adjustment and function are checked by personnel at highway truck inspection points who have the power to pull a tractor or trailer out of service until the brakes are adjusted and functioning properly. Brake adjustment is time consuming, especially given the large number of wheels on tractor trailer vehicle. Self-adjusting brakes have therefore been developed for use on both tractors and trailers and operate to maintain proper adjustment of brakes and keep the vehicle on the road, however brake maintenance to correct wear on brakes remains a considerable expense for the owner of tractors and trailers.

BRIEF SUMMARY OF THE INVENTION

It is an object of the present invention to provide a method and apparatus for reducing wear and incidences of poor adjustment of trailer brakes that overcomes problems in the prior art.

It is common in the trucking industry for trailers to be owned by a trucking company who in turn hires tractors owned by owner-operators to pull the trailers to their various destinations. The owner-operator typically owns the tractor, and either drives it himself or hires the person who does the driving. Thus the trucking company owns the trailers while the tractors are owned by a different party who controls how the tractor trailer vehicle is operated.

In order to save wear on the tractor brakes it is generally known that owner-operators will often use the manual trailer brake control to operate the trailer brakes without coincidentally operating the tractor brakes. Thus the trailer brakes are required to stop the tractor trailer vehicle alone without assistance from the tractor brakes. This causes significantly increased wear on the trailer brakes and costly premature replacement of trailer brakes. The problem is somewhat exacerbated by self-adjusting brakes, which ensure proper adjustment of the trailer brakes until they are virtually worn out and require replacement. Where trailer brakes are not self adjusting, constant use of trailer brakes 20 alone using the manual trailer brake control will wear the brakes down such they may require adjustment by the operator prior to the destination. The operator is thus more inclined to operate the brakes of the tractor trailer vehicle to avoid having to make this time consuming adjustment.

For comparative mileage, brakes on trailers pulled by owner-operators often require a complete replacement two or three times a year. This compares to trailers where the trailers and the trucks pulling them are owned by the same entity where the brakes may require replacement only about once every two years. At several hundred dollars per replacement, the extra costs for trailer owners are significant.

Many trucking companies presently require that tractors hired from owner-operator to pull their trailers be equipped with "tattletale" speed recorders, GPS systems, and the like so that the trucking company can monitor the operation of their trailers. Insurance costs for trailers can be reduced for example by ensuring that they are not pulled at speeds exceeding a set limit.

The present invention provides, in a first embodiment, for installation in a highway tractor with a manual trailer brake control mounted in the tractor, wherein the tractor is adapted for connection to a trailer such that activating the manual trailer brake control activates trailer brakes mounted on the trailer, a manual trailer brake monitor apparatus. The apparatus comprises a brake control sensor operative to detect each manual trailer brake control activation, and a recorder operatively connected to the brake control sensor, and operatively connectable to a speed sensor, wherein the recorder is operative to receive and store data comprising a speed of the tractor at each manual trailer brake control activation.

The present invention provides, in a second embodiment, highway tractor manual trailer brake monitor apparatus comprising a manual trailer brake control mounted in a highway tractor, and wherein the tractor is adapted for connection to a trailer such that activating the manual trailer brake control activates trailer brakes mounted on the trailer. A brake control sensor is operative to detect each manual trailer brake control activation, and a recorder comprises a microprocessor operatively connected to the brake control sensor, and operatively connected to a speed sensor, and operatively connected to a clock. The microprocessor is operative to record and store data comprising a speed of the tractor at each manual trailer brake control activation and the time and date of each manual trailer brake control activation.

Thus the trailer owner can determine whether the manual trailer brake control is being activated only at low speeds of about 5-10 kilometers per hour (kph) to test the trailer brakes and tractor trailer connection with a tug test, or whether the control is being activated at higher speeds to save the tractor brakes.

The monitor can be connected to the manual trailer brake control airline, which is typically a separate line that is only pressurized when the manual trailer brake control is activated. Alternatively a switch can be positioned to detect movement of the manual trailer brake control to the activating position, however it is contemplated that monitoring air pressure will render the monitor less subject to tampering. Speed information can be gathered electronically from more modern tractors, or mechanically from older tractors in a manner similar to that used by prior art speed monitors, or from a Global Positioning System, or any like means. The monitor typically comprises a microprocessor operative to receive and store the speed and manual trailer brake control activation data. The data can be loaded to a memory card or like memory device at intervals, or transmitted for review. Time and date data is typically also recorded and correlated to the activation of the manual trailer brake control for tracking each tractor trailer vehicle.

Typically a trailer owner will negotiate a contract with the owner-operator that stipulates that for each use of the manual trailer brake control at a speed that is above a set limit, for example 15 kph, the owner-operator will pay a fine or penalty of a set amount, for example $25 or $50. Jack-knife situations are relatively rare, and so very occasional activation of the manual trailer brake control could be excused. The data will also indicate whether the operator of the tractor is checking the trailer brakes and tractor trailer connection by showing whether the manual trailer brake control was activated at low speeds. Safety could be improved by penalizing owner-operators for failure to perform these checks. A reward system could also be used to reward those operators complying with the companies operating procedures.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic view of an embodiment of the monitor apparatus of the invention installed in a highway tractor.

DETAILED DESCRIPTION OF THE INVENTION

FIG. 1 schematically illustrates a manual trailer brake monitor apparatus 1 of the invention for detecting activation of the manual trailer brake control 3 in a highway tractor trailer vehicle comprising a highway tractor connected to a trailer.

The manual trailer brake control 3 is typically located on the dashboard of the tractor and is activated by pulling on the control handle. The tractor also includes a foot pedal 5 connected to a pedal valve 7 that is charged with compressed air from a compressed air supply 9. When the pedal 5 is depressed, air is directed from the supply 9 through the pedal valve 7 to air line 11 which is connected to the tractor brakes 13 and to check valve 15. The air flows through check valve 15 to air line 17 connected to the trailer brakes 19. Thus depressing the pedal 5 provides compressed air to operate both the trailer brakes 19 and the tractor brakes 13 manual trailer brake control 3 is connected to a manual valve 21 that is also charged with compressed air from a compressed air supply 9. When the manual trailer brake control 3 is pulled, air is directed from the supply 9 through the manual valve 21 to air line 23 which is connected to the check valve 15. The air flows through check valve 15 to air line 17 that is connected to the trailer brakes 19 when the tractor is connected to the trailer. Thus pulling the manual trailer brake control 3 operates only the trailer brakes 19.

The check valve 15 is operative such that air can flow from die air lines 11 or 23 into the check valve 15 and through the check valve to air line 17 but air cannot flow from the check valve 15 backward into either air line 11 or 23. Thus when the foot pedal 5 is depressed no air flows into air line 23 connected to the manual valve 21, and so compressed air is not present in air line 23 when the pedal 5 is depressed. Similarly when the manual trailer brake control 3 is pulled, no air flows into air line 11 and thus the tractor brakes 13 are not operated.

Such tractors typically include primary and back up secondary air circuits that are well known to those skilled in the art and so only those elements of the brake system of a typical tractor trailer vehicle that are required for schematic illustration of the principles of the present invention are illustrated. Those knowledgeable in the art will recognize that the tractor and trailer brakes are operated by directing compressed air into appropriate lines, which compressed air operates to actually release compressed air at the brakes to activate the brakes. This system is used in modern air brake systems so that if the air system fails and no compressed air is available, the brakes will activate to stop the S vehicle.

Air pressure sensor 25 is connected to air line 23 and is operative to detect the presence of compressed air in air line 23, and send a signal to a microprocessor 27 that compressed air is present. Compressed air will only be present in air line 23 when the manual trailer brake control is pulled to operate the trailer brakes 19 without operating the tractor brakes 13. Thus the signal to the microprocessor indicates that the manual trailer brake control 3 has been activated.

The microprocessor 27 is also connected to receive data from a speed sensor 29 indicating the speed of the tractor trailer vehicle. The microprocessor 27 records any occurrence of manual trailer brake control activation, and the speed of the tractor trailer vehicle during each activation of the manual trailer brake control 3. The microprocessor 27 typically also includes a clock such that the microprocessor also records the time and date of manual trailer brake control activation. The data can be downloaded from the microprocessor 27 to a removable memory device, such as a card or disc, or transmitted via a satellite or wireless transmission, for review.

FIG. 1 also illustrates a switch 33 under the manual trailer brake control 3 that can be connected to the microprocessor 27 to record any activation of the manual trailer brake control 3 as an alternative to, or in addition to, the air pressure sensor 25.

The apparatus 1 can be used to reduce trailer brake wear, typically by a trucking company that owns trailers and contracts with independent tractor owner-operators to pull the trailers. The company will arrange for installation of the manual trailer brake monitor apparatus 1 in the contracted highway tractor, and will authorize the owner-operator to activate the manual trailer brake control only at specified low tractor speeds, typically 5-10 kph, such as required to test a trailer connection.

The data will be reviewed periodically to determine the speed of the tractor at each manual trailer brake control activation, and the owner-operator will be penalized by a fine of some amount for each unauthorized manual trailer brake control activation which occurs at speeds above the specified low speeds. The company may make allowances for occasional use above the specified speed such as may be required to correct a jack-knife situation, or like condition that might arise on occasion in the local where the vehicle is operating.

At the same time, the apparatus 1 may be use to ensure secure connection of the contracted highway tractor to a trailer. The owner-operator will be instructed to activate the manual trailer brake control 3, at a speed within a specified low range such as 5-10 kph, after connecting the tractor to a trailer to test the connection of the tractor to the trailer. Again the data will be reviewed periodically to determine the speed of the tractor at each manual trailer brake control activation and the time and date of each manual trailer brake control activation, and the data will be compared to a history of the tractor's operations to determine if times of connecting the tractor to a trailer correspond to the time and date of a manual trailer brake control activation.

Modem computer scheduling, routing, and tracking records forming the history of operations should allow fairly accurate correlation of the manual trailer brake control activation to the times when the tractor was connected to a trailer. The owner-operator of the highway tractor would then be penalized by a fine or the like for each failure to test the connection of the tractor to the trailer by activating the manual trailer brake control as instructed.

The foregoing is considered as illustrative only of the principles of the invention. It is intended that all matter contained in the above description or shown in the accompanying drawing shall be interpreted as illustrative and not in a limiting sense. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A manual trailer brake monitor apparatus for installation in a highway tractor with a manual trailer brake control mounted in the tractor, wherein the tractor is adapted for connection to a trailer such that activating the manual trailer brake control activates trailer brakes mounted on the trailer, the manual trailer brake monitor apparatus comprising:
   a brake control sensor operative to detect each manual trailer brake control activation;
   a recorder operatively connected to the brake control sensor, and operatively connectable to a speed sensor, wherein the recorder is operative to receive and store data comprising a speed of the tractor at each manual trailer brake control activation.

2. The apparatus of claim 1 wherein the recorder is operatively connected to a clock, and wherein the recorder is operative to receive and store data comprising a speed of the tractor at each manual trailer brake control activation and the time and date of each manual trailer brake control activation.

3. The apparatus of claim 1 wherein the manual trailer brake control activates the trailer brakes by directing compressed air into an air line, and wherein the brake control sensor is operative to detect the presence of compressed air in the air line.

4. The apparatus of claim 1 wherein the brake control sensor comprises a switch and wherein the manual trailer brake control contacts the switch when activated.

5. The apparatus of claim 1 wherein the recorder comprises a microprocessor operative to store the data.

6. A highway tractor manual trailer brake monitor apparatus comprising:
   a manual trailer brake control mounted in a highway tractor, and wherein the tractor is adapted for connection to a trailer such that activating the manual trailer brake control activates trailer brakes mounted on the trailer;
   a brake control sensor operative to detect each manual trailer brake control activation;
   a recorder comprising a microprocessor operatively connected to the brake control sensor, and operatively connected to a speed sensor, and operatively connected to a clock, wherein the microprocessor is operative to record and store data comprising a speed of the tractor at each manual trailer brake control activation and the time and date of each manual trailer brake control activation.

\* \* \* \* \*